United States Patent [19]
Oskoui

[11] Patent Number: 4,586,246
[45] Date of Patent: May 6, 1986

[54] METHOD FOR ASSEMBLING RESISTANCE TEMPERATURE DETECTOR

[75] Inventor: Rayyaneh M. Oskoui, Round Rock, Tex.

[73] Assignee: Weed Instruments Co., Inc., Round Rock, Tex.

[21] Appl. No.: 584,714

[22] Filed: Feb. 29, 1984

[51] Int. Cl.[4] ............................................. H01C 7/02
[52] U.S. Cl. ....................................... 29/612; 29/613; 29/614; 29/615; 29/619; 338/28; 338/229
[58] Field of Search ................................. 29/612–615, 29/619; 136/230, 231; 338/25, 28, 229, 238; 374/208, 209

[56] References Cited

U.S. PATENT DOCUMENTS

| | | | |
|---|---|---|---|
| 1,018,673 | 2/1912 | Madsen | 338/229 |
| 2,588,014 | 3/1952 | Knudsen | 338/28 |
| 2,750,483 | 6/1956 | Voorman, Jr. | 374/185 |
| 3,716,417 | 2/1973 | Evans | 136/231 |
| 3,955,419 | 5/1976 | Barton et al. | 338/28 |
| 4,311,982 | 1/1982 | Trietley, Jr. | 338/25 |

FOREIGN PATENT DOCUMENTS 336536  4/1972  U.S.S.R. ...................... 374/185

Primary Examiner—Howard N. Goldberg
Assistant Examiner—P. W. Echols
Attorney, Agent, or Firm—Arnold, White & Durkee

[57] ABSTRACT

There is provided a method for assembly of temperature probes. An insertion element or sensor such as a resistance temperature detector is mounted in a receiving cavity and surrounded by sufficient packing to electrically insulate the sensor. A stalk is utilized as a conduit for routing and insulating lead wires through the support casing. The stalk is notched at a point to facilitate the connection of wires threaded through the stalk to the sensor wires and to minimize the inadvertent contact of these wires with the metallic surfaces. The notch in the stalk protects the junction from contact with the metallic sides of the guide walls and protects the junction from mechanical stresses. To further protect the junction of the lead and sensor wires, the sensor is placed adjacent and parallel to the stalk prior to insertion. The stalk and the sensor are inserted simultaneously with the stalk coming to rest before the sensor travel stops, thereby minimizing the stresses to the junction. The stalk is guided and supported by a cavity in the tip casing. A support casing is mated to one end of the tip casing.

13 Claims, 9 Drawing Figures

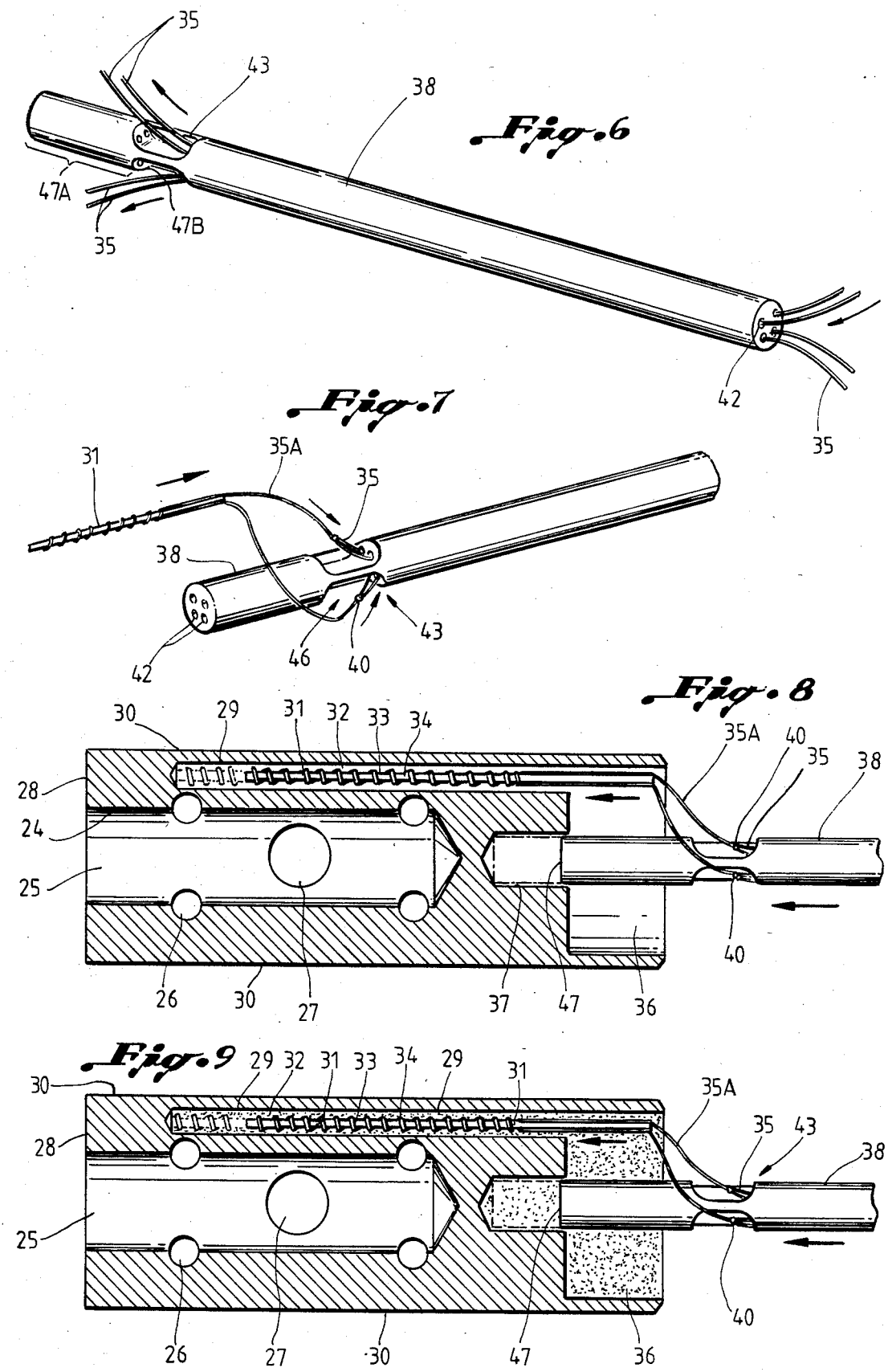

METHOD FOR ASSEMBLING RESISTANCE TEMPERATURE DETECTOR

BACKGROUND OF THE INVENTION

This invention relates to a method of assembling an instrument and more particularly to a resistance temperature detector wherein assembly requires insertion of a relatively delicate element having an attached electrical lead into a receiving cavity. Specifically, the invention relates to assembly of a resistance temperature detector such as that described in copending U.S. patent application Ser. No. 581,426 filed on Feb. 17, 1984 titled Temperature Probe [hereinafter Temperature Probe specification].

Resistance thermometers or temperature detectors have been used in many industrial applications. A resistance thermometer depends upon the variation of the electrical resistance of a wire with temperature. Most metals become more resistant to the passage of an electrical current as the metal increases in temperature. The increase in resistance is generally proportional to the rise in temperature. Thus, a constant current passed through a metal of varying resistance produces a variation in voltage that is proportional to the temperature change.

In many cases, resistance temperature detectors and similar instruments must be designed and constructed to be shock resistant. For example, many resistance temperature detectors employ a sensing element in the form of a platinum wire having a very small diameter. The platinum wire is wound around a ceramic or glass mandrel or other support to form a sensing element. The wire is secured by coating the wire and the mandrel or support with a refractory cement or glass.

The sensing element is placed in contact with a signal conditioner by use of lead wires, which are fused to the sensing element. The sensing element is then inserted inside a piece of hollow cylindrical metal tubing or casing, which is normally made of stainless steel. The sensing element is then secured. For example the space between the interior walls of the hollow cylindrical metal tubing and the sensing element may be filled with a compacted refractory powder such as magnesium oxide or a ceramic cement to prevent damage to the sensor due to vibration and otherwise secure the sensing element.

The patent literature discloses a variety of temperature measuring devices. MacKenzie et al, U.S. Pat. No. 4,087,775 is illustrative here. According to that disclosure, there is provided a temperature measuring probe and a mode of assembling the element in a reliable manner against shock and vibration. More particularly, according to that disclosure, there is provided a commercial resistance temperature detector element including a solid insulating mandrel upon which a helical winding of suitable resistance wire is wound. The winding is encased in glass fused in place or fired ceramic and the terminal ends of each winding are brought out for connection to a suitable circuit. The resistance temperature detector is supported in a metallic sheath made of stainless steel. The element is supported in and insulated with respect to the sheath by means of a firmly compacted mass of a pulverized or refractory material such as magnesium oxide. The terminal leads of the element and the pulverized refractory material are leveled adjacent one end of the sheath, as by counterboring, to provide a chamber to house the connections between the terminal leads of the resistance temperature detector element as conductors. The resulting chamber has an interior portion of the sheath as its lateral wall. A bore is then drilled on the principal axis of the sheath of such length and diameter as to receive the sensing element with a comfortable fit yet loose enough to allow placement of an adequate layer of cement. After insertion of the element into the bore and curing of the ceramic cement, conductors are welded to the terminal leads to connect the resistance temperature detector element with the appropriate measuring devices.

Chambers, U.S. Pat. No. 3,267,733 is further illustrative of resistance thermometers disclosed in the patent literature. According to that disclosure, an elongated resistive element in the form of an interwound spiral is encapsulated and supported in an oxide encapsulation. The oxide encapsulation is supported with a refractive metal or ceramic tube, which in turn is suitably secured to a sleeve. Wires connecting to the elongated resistive element pass through the sleeve 12, where they are supported by a pure beryllium oxide insulation.

Beaudoin et al, U.S. Pat. No. 4,011,654 discloses an exhaust gas sensor probe. According to that disclosure, a tube of ceramic material is arranged to support a resistive type ceramic sensor. The tube is provided with a generally continuous groove around the portion of its exterior to support a heater wire in close heat conductive relation to the sensor. A housing sleeve is provided with a plurality of fin members. The fin members provide for radiation of heat energy to protect the electrical terminals while providing a convenient mechanism to control the depth of penetration of the probe within an associated exhaust system so that the sensor will be properly positioned at the approximate center of the associated exhaust gas conduit.

The following patents are further illustrative of other temperature sensing devices: Picciano, U.S. Pat. No. 2,379,317; and Micheli et al, U.S. Pat. No. 3,896,409.

These and other prior temperature sensing devices and temperature probes suffer from one or more defects or limitations. Many of the probes are too fragile in construction to provide sufficient ruggedness. For example, the device may fail or, after several months exposure to a process stream, suffer an unacceptable reduction in response time.

Still other probes are designed such that probe seals have a reduced life expectancy, thus requiring more expensive seals or their frequent replacement. Further, a failure of the seal may lead to low insulation resistance from moisture penetration and a loss of accuracy. The failure of the seals is often caused by conduction of heat from the temperature probe. Such heat conduction can also cause failure of wire insulation, thus leading to undesirable results.

These and other limitations of prior temperature sensing devices are minimized by the device disclosed in the above-referenced Temperature Probe specification.

In one embodiment of the resistance temperature detector disclosed in the above-referenced copending patent application, a temperature probe is provided for measuring the temperature of the probe's surroundings. A metallic tip casing is provided with at least one receiving cavity. A sensor is mounted into each receiving cavity and surrounded by packing. Each sensor is made of a substrate and a temperature sensing element mounted on the substrate. An electrical lead is also provided for placing the sensor in electrical communication with a signal conditioner.

The potentially small dimensions of the receiving cavities and the sensors, and the difficulties in manipulating multiple sensors with their electrical leads during assembly, make it desirable to have a method that facilitates assembly of a detector. Prior methods of assembly suffer from one or more of several defects or limitations. For example, the relative dimensions or overall design of the probes are limited at least in part by the need to maintain quality control during assembly. Other methods are time consuming and require relatively extensive use of additional equipment during assembly. These and other limitations of prior assembly methods are minimized by the present inventive method.

SUMMARY OF THE INVENTION

There is provided a method for assembly of temperature probes. An insertion element such as a resistance temperature detector or temperature sensor is mounted in the interior wall receiving cavity and surrounded by sufficient packing to electrically insulate the sensor from the tip casing wall. The packing also insulates the temperature sensor wires and lead wires from the inadvertent contact with the tip casing walls and the guide cavity walls. A generally rigid stalk is utilized as a conduit for routing and insulating lead wires through the support casing, from the measuring device, to the sensor located in the tip. The generally rigid stalk is notched at a point to facilitate the connection of wires threaded through the stalk to the sensor wires and in a manner to minimize the inadvertent contact of these wires with the metallic surfaces of the tip. The notch in the generally rigid stalk serves as a recess and protects the junction from contact with the metallic sides of the guide walls and protects the junction from mechanical stresses during assembly and while the temperature probe is in operation. To further protect the junction of the lead and sensor wires and to minimize flexing of the sensor and lead wires the sensor is placed adjacent and parallel to the stalk prior to insertion. At the time of insertion, the stalk and the sensor are inserted simultaneously, with the stalk coming to rest before the sensor travel stops, thereby minimizing the stresses to the junction imposed by the sensor or insertion element coming to an abrupt stop. The generally rigid stalk is supported by a guide cavity in the tip casing during assembly, to facilitate centering of the stalk and aid in the maintenance of proper clearances of the sensor wires and lead wires. A support casing is mated to one end of the tip casing with at least that portion of the support casing adjacent to the tip casing having an effective thermal conductivity lower than that of the tip casing.

BRIEF DESCRIPTION OF THE DRAWINGS

FIG. 6 is an isometric view of a portion of the embodiment shown in FIG. 2;

FIG. 7 is a detailed view of a portion of a detector being assembled;

FIG. 8 is a detailed section of a portion of a detector partially assembled; and FIG. 9 is a detailed section of the partially assembled detector shown in FIG. 8.

There follows a detailed description of the present inventive method in conjunction with the foregoing drawings. This description is to be taken by way of illustration rather than limitation.

DETAILED DESCRIPTION

Figure 1:
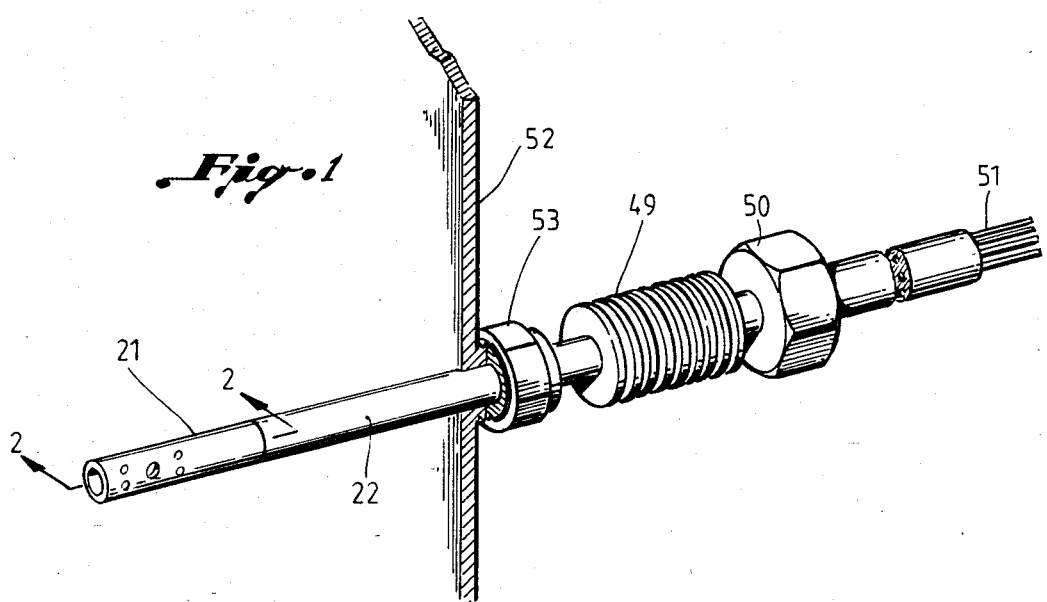
FIG. 1 is a schematic view of an embodiment of a resistance temperature detector.
Figure 2:
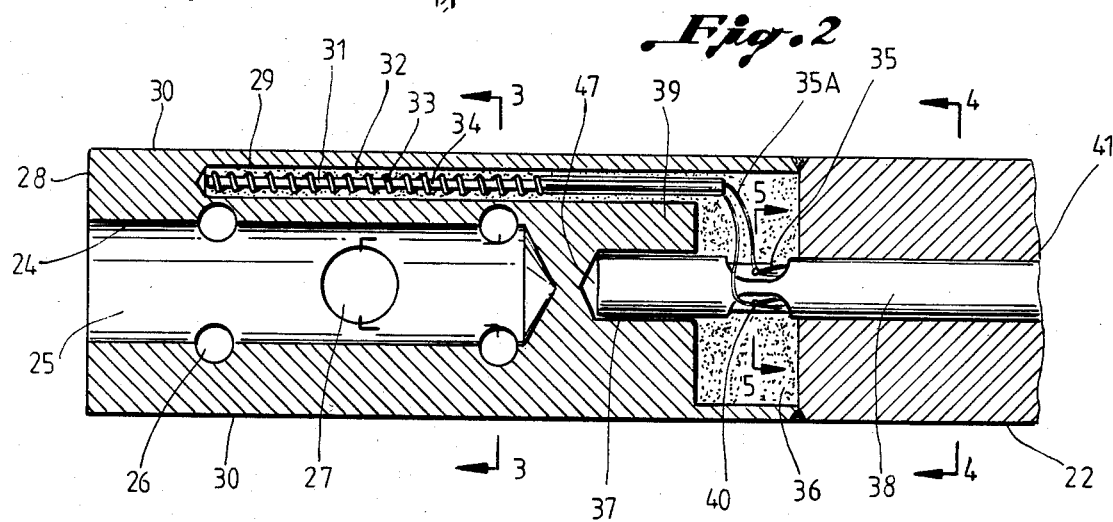
FIG. 2 is a cross-sectional view of the embodiment shown in FIG. 1 and taken along line 2—2.
Figure 3:
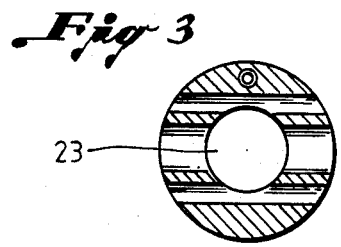
FIG. 3 is a cross-sectional view of the embodiment shown in FIG. 2 and taken along line 3—3.
Figure 4:
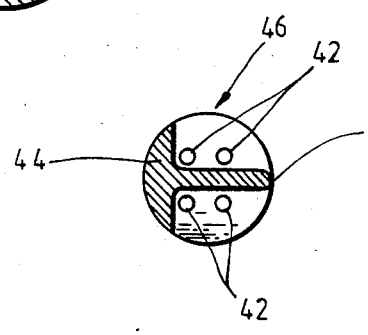
FIG. 4 is a cross-sectional view of the embodiment shown in FIG. 2 and taken along line 4—4.

Referrring generally to FIGS. 1 and 2, there is shown an embodiment of a temperature probe which may be assembled according to the present invention. Referring generally to those figures, a tip casing such as cylindrical metal case 21 provides a temperature sensitive tip for the temperature probe. A support casing such as cylindrical metal casing 22 forms the remainder of the temperature probe including the stem. The tip casing is generally made of metal or other material which provides strength and has a high thermal conductivity. By way of example only, the tip casing may be made of nickel.

The tip casing has an interior casing cavity such as cavity 23. The interior casing cavity is in thermal communication with the probe's surroundings. This is preferably accomplished by placing the interior surface 24 of the interior casing cavity such as casing 23 in fluid communication with the temperature probe's surroundings. As indicated in the drawings and disclosed in the above referenced Temperature Probe specification, this may be accomplished by having an interior casing cavity such as cavity 23 end in an opening or aperture such as opening or aperture 25.

As also disclosed in the above referenced Temperature Probe specification fluid communication between the interior casing cavity and the temperature probe's surroundings may be further enhanced by the provision of further openings such as transverse holes or passages such as passages 26 and 27. Such holes or openings may be employed whether or not the interior casing cavity is completely or partially hollow or evacuated so as to expose the interior surface 24 of the interior casing cavity to the fluid surroundings of the probe. If the interior casing cavity is partially or completely filled with another material, such material generally should have preferably at least as high a thermal conductivity as the tip casing walls and may be employed to provide additional strength to the tip casing.

The size of the interior casing cavity such as cavity 23 and the remaining mass of the tip casing including any packing as well as any portion of the support casing exposed to the fluid surroundings to be measured are balanced to insure or maintain sufficient strength along the probe to resist breakage of the probe, while still providing sufficient exposure to the fluid surroundings to facilitate operation of the temperature probe. By way of example, the number and arrangement of the openings to the interior casing cavity such as transverse holes 26 and 27 may be balanced to facilitate the flow of a fluid medium from fluid surroundings through at least a portion of the interior casing cavity while minimizing vibrations caused to the tip casing by the flow of fluid medium through or over and around the tip casing and support casing.

The tip casing walls such as walls 28 are equipped with interior wall cavities such as generally cylindrical wall cavities 29. The interior wall cavity or cavities are located with respect to the interior casing cavity so as to facilitate heat transfer between the two cavities. By way of example, as shown in the drawings, the interior wall cavities such as generally cylindrical wall cavities 29 may share a common wall with the interior casing cavities such as cavity 23 for at least a portion of its length. Preferably, the interior wall cavity such as generally cylindrical wall cavity 29 is located close to the exterior wall surface 30 of tip casing walls such as walls 28. As such exterior wall surface 30 is in direct heat exchange relation with the probe's surroundings. The minimal distance between the exterior wall surface and interior wall cavity offers reduced resistance to heat transfer and facilitates heat transfer into the interior wall cavity. Further, at least a portion of the interior wall cavity preferably extends between the interior surface 24 of the interior casing cavity such as cavity 23 and the external wall surface such as surface 30 of walls 28. As the interior wall cavity such as generally cylindrical cavity 29 is in close thermal contact with the exterior wall surface such as surface 30 and the interior surface such as surface 24 of cavity 23, the transfer of heat from the temperature probe's surroundings is thus facilitated.

A sensor such as sensor 31 is mounted in the interior wall cavity or receiving cavity such as generally cylindrical wall cavity 29. The sensor is supported and electrically insulated from the tip casing wall such as walls 28. This is preferably accomplished by means of a packing or displaceable support material such as refractory packing material 32. The thickness of the packing should be generally sufficient to provide support and electrical insulation for the sensor, while not being so thick or having such a thermal conductivity as to substantially hinder the transfer of heat to the sensor such as sensor 31. By way of example, the packing material may comprise high temperature refractory cement exhibiting properties of good thermal conductivity and high electrical resistance. Such a refractory cement aids in dampening vibration and shock and electrically insulates the sensor. Ultimately, the packing may be any of a variety of materials, all as would be known to one skilled in the art having the benefit of this disclosure.

An insertion element or sensor such as sensor 31 may include a temperature sensing element such as coiled wire 33. The temperature sensing element will generally be mounted on a support or substrate such as elongated support 34. By way of example, the sensor may include one or more platinum wires coiled around an alumina substrate or support. A variety of other sensors including different substrates or temperature sensing elements may be used in the present invention, all as would be known to one skilled in the art having the benefit of this disclosure.

A lead wire 35 is provided for placing the sensor in communication with a measuring device for measuring the sensing elements response to changes in temperature in the probe's surroundings such as would be caused in a change in a surrounding fluid. For example, a lead wire such as wires 35 could be employed with one end (the terminus or tip end of the lead) connected to the sensor such as sensor 31 and the other end being connected to other wires or an appropriate measuring device such as a signal conditioner.

The tip casing such as cylindrical metal casing 21 is also equipped with an interior void volume such as hollowed out volume 36. Such a void volume serves not only to facilitate placing of the lead wires such as wires 35 with respect to the sensor, such as sensor 31, but can also accommodate an insulating material which can either electrically or thermally insulate the lead wire such as wires 35. By way of example, a high temperature refractory cement which can be employed in the interior wall cavity such as generally cylindrical wall cavities 29 may also be used to fill in the initially hollowed out volume 36 after the lead wires, such as wires 35, are set in place, thus serving to electrically insulate the lead wires such as wires 35 and insure better performance of the temperature probe.

Referring to FIGS. 2, 8 and 9, wherein FIG. 2 among other things illustrates the notched portion of a rigid stalk and the frustoconical inner cavity used as a support for the stalk; FIG. 8, among other things, illustrates the end of the sensor prior to the complete insertion of the sensor and the rigid stalk, with the sensor located adjacent and parallel to the stalk and the sensor wire pulled back into the notch and protected by the santuary provided by the notch in the rigid stalk; and FIG. 9, among other things, illustrates the end of the sensor with the sensor receiving cavity and stalk guide cavity filled with displaceable support material prior to the complete insertion of the sensor and rigid stalk with the sensor located adjacent and parallel to the stalk and the sensor and lead wire junction pulled back and protected by the sanctuary provided by the notch in the rigid stalk.

The hollowed out volume 36 is provided with a guide cavity 37. This guide cavity is located at the end opposite casing cavity 23. By way of example, the guide cavity 37 may consist of a frustoconical inner surface. The guide cavity 37 guides a stalk 38 to insure proper clearances of lead wires 35 and sensor wires 35A. Although all or a portion of the guide cavity may be frustoconical in shape, it is preferred that the clearance between the stalk 38 and the guide cavity 37 is kept to a minimum to provide maximum support for the stalk. By way of example, both the guide cavity and the stalk 38 could be generally cylindrical in shape. Depending upon size and configuration, the clearance might only be a few thousandths of an inch. Further, the overall size of the guide cavity 37 may vary. For example, it may be the same diameter as the interior casing cavity.

Guide cavity depth is controlled in order to prevent lead wires 35 and sensor wires 35A from touching the guide cavity walls 39 and to control the insertion of sensor 31 into sensor cavity 29 thus assuring the proper electrical insulation of the sensor wires 35A and lead wires 35. The position of the guide cavity with respect to the exterior wall surface is controlled to assure accurate placement of the rigid stalk 38 and proper retention of the stalk during the time period required for the refractory cement or packing to set.

The generally rigid stalk 38 functions as a conduit for communicating the detector wires from the exterior measuring device to the junction point 40, through the support casing longitudinal bore 41. By way of example, the generally rigid stalk 38 may be a ceramic tube with longitudinal bores 42. For example in one embodiment four longitudinal bores 42 pass through the rigid stalk 38. The longitudinal bores 42 provide the electrical insulation of lead wires 35 as they are routed through support casing longitudinal bore 41. The wires are insulated with respect to each other and with respect to the support casing walls for the entire length of the support casing.

In an embodiment, a resistance temperature detector is utilized as a sensor 31. To facilitate accurate measurement of the loop lead resistance from the measuring device to the sensor 31 four lead wires are utilized. As is shown in FIG. 6, four wires are threaded into the generally rigid stalk 38 longitudinal bores 42 and out of the notched opening 43. Two of the wires are fused together as they exit the notched section 43 of the generally rigid stalk 38. The wires are fused together or attached together at junction point 40. Each junction point 40 is attached to an electrically distinct termination point of the resistance temperature detector.

Figure 5:
FIG. 5 is a cross-sectional view of the embodiment shown in FIG. 2 and taken along line 5—5.

In order to facilitate the fusing of the sensor wires at junction 40 and to insure the electrical insulation of each junction 40 the generally rigid stalk 38 is notched. By way of example only, the notch may be prepared in the manner illustrated in FIG. 5. The mushroom shaped portion 44 of the stalk represents the stalk material which is left on the generally rigid stalk 38 after completion of the notching of the stalk 38. In the example wherein ceramic tubing was used for the generally rigid stalk 38, the mushroom shaped portion 44 represents ceramic material which is not removed during the notching of stalk 38. The stem portion 45 also represents stalk material which is not removed. This stem portion 45 serves as a barrier between each pair of longitudinal bores 42 and facilitates the electrial insulation of joints 40. In the example wherein a ceramic tube was used for the rigid stalk 38, the stem portion 45 represents a ceramic barrier.

Openings 46 are prepared by notching the rigid stalk 38 to form a recess of sufficient size to include the junctions 40. The placement of junctions 40 in the recess 46 facilitates the electrical insulation of junctions 40 with respect to each other and with respect to the guide cavity walls 39. For example as illustrated in FIG. 7, the junctions 40 are placed in the recesses 46, after fusing the sensor wires 35A and the lead wires 35 together, by pulling back on the lead wires 35.

To further protect the junction 40 during the assembly of the temperature probe, the sensor 31 is placed parallel and adjacent to the generally rigid stalk 38. As illustrated in FIG. 7 in a manner to minimize the stress to junction 40 during the insertion of the sensor 31 and the stalk 38 into the sensor cavity 29 and the stalk guide 37, respectively.

The notch or openings 43 are positioned between the stalk tip 47 and the stalk extension end 47A in a manner forming a barrier wall 47B between the stalk tip 47 and the stalk notch 43.

The notched section 43 is notched at a distance from the end 47 of the generally rigid stalk 48 which facilitates the electrical insulation of lead wires 35, sensor wires 35A, and junctions 40 with respect to the guide cavity walls 39 when the generally rigid stalk 38 is inserted in the guide 37. Thus, the notch 43 aids in the electrical insulation of lead wires 35, sensor wires 35A and junction 40 with respect to the guide cavity walls during assembly of the sensor tip 21 and during the time period required for the refractory cement in volume 36 to set.

FIG. 8 illustrates the position of the sensor 31, the stalk 38 and the junction 40 prior to insertion of the sensor 31 and the stalk 38 with cavities 37 and 29 empty. FIG. 9 illustrates an alternate embodiment, with the position of sensor 31, stalk 38 and junction 40 shown prior to insertion of the stalk 38 into guide 37, and prior to insertion of the sensor 31 into cavity 29 with the cavities 29 and 37 filled with displaceable material 36 prior to insertion.

A support casing such as cylindrical metal casing 22 is integrally attached to the tip casing such as cylindrical metal casing 21. This may be accomplished in a variety of ways such as by welding or by other methods as would be known to one skilled in the art having the benefit of this disclosure. In any event, the connection between the support casing and the tip casing should be such as to minimize chances of breakage of the probe and provide sufficient support between the support casing and the tip casing for the particular configuration of the tip casing. This balancing may be accomplished by variation in size, structure and materials of the various parts, all as would be known to one skilled in the art having the benefit of this disclosure.

The support casing should serve as a partial thermal barrier in order to enhance the overall performance of the probe. At least that portion of the support casing adjacent to the tip casing preferably should have an effective thermal conductivity lower than that of the tip casing. By way of example, the support casing such as cylindrical metal casing 22 may be made up of a metal having a lower thermal conductivity than the metal in cylindrical metal casing 21. Thus, the support casing 22 may be made of stainless steel, while the cylindrical metal casing 21 may be made of nickel. Alternately, it may be possible to reduce that portion of the support casing which is integrally mounted to and in direct contact with the tip casing. Alternately, the support casing can comprise two types of material, one of which forms at least a substantial portion of the support casing adjacent the tip casing, thus reducing the overall thermal conductivity of that portion of the support casing adjacent to the tip casing. However, it is believed preferable to provide a support casing made up largely or entirely of metal such as cylindrical casing 22 in order to provide sufficient overall strength to the probe, particularly when openings such as transverse holes 26 and 27 are employed to place the interior casing cavity in fluid communication with the temperature probe's surroundings.

The support casing 22 is equipped with a support casing longitudinal bore such as defined by elongated passageway 41. The support casing longitudinal bore or cylindrical void serves to facilitate communication between the sensor and the measuring device for measuring the sensing elements response to changes in temperature of the probe's surroundings. For example, as indicated by the drawings, the support casing cavity can be defined by elongated passage 41 through which a lead wire such as wires 35 are passed. The generally rigid stalk 38 serves to separate sensing element wires 35 in the supporting casing cavity defined by elongated passageway 41, such elements being, in turn, fused to sensor wires 35A. Ultimately, other forms of lead wires 35 and sensors 31 could be employed, all as would be known to one skilled in the art having the benefit of this disclosure.

As shown in FIG. 1, the support casing can be further equipped with a heat dissipation mechanism such as fins 49 which facilitates transfer of heat to a heat sink such as ambient or flowing air or a fluid conduit in heat exchange relation with the heat dissipation mechanism. The presence of a heat dissipation mechanism reduces the amount of heat traveling along at least part of the support casing. This, in turn, reduces the temperature of various items which are in thermal contact with the support casing, particularly where they are located downstream of the heat dissipation mechanism. For example, as shown in FIG. 1, where a seal, such as probe seal 50, is employed at the end of the support casing, a heat dissipation mechanism such as fins 49 may be located at a point near the seal and between the tip casing and the seal, thus reducing the overall average temperature to which the seal is exposed. This, in turn, can result in improved longevity of the seal. This can be so even in cases where the heat dissipation mechanism such as fins 49 may be exposed to relatively high temperatures at periodic intervals for short periods of time. As a result, the probe seal is less likely to degrade and will generally have a longer useful life. This, in turn, reduces the chances for moisture or other contaminants to enter the support and tip casings, thus improving overall life and reliability of the temperature probe. Additionally, the use of a heat dissipation mechanism also reduces thermal stress on other elements such as wires or leads 51. The presence of the heat dissipation mechanism may also allow a reduction of insulation required.

The heat dissipation mechanism may take on any of a variety of forms as would be known to one skilled in the art having the benefit of this disclosure. By way of example, as indicated in drawings, the heat dissipation mechanism may include a plurality of fins 49. Such fins may be made of a variety of materials such as stainless steel or the like.

As indicated, the heat dissipation mechanism is preferably located at a point outside of the surroundings to be measured. For example, as shown in FIG. 1, the fins 49 are located on the side of wall 52 and stop 53 opposite from the tip casing 21.

Referring to the embodiments generally depicted in the drawings and described as illustrative above, use of one or more ruggedized sensors such as platinum sensing elements inside a probe wall can result in several advantages as compared to other devices, including those which placed the sensing element between the walls of a tube. Since this sensing element is located within the wall of the probe, the inside of the probe may be left open to the probe's surroundings and where fluid flow is involved, flow through the various openings such as transverse holes 26 and 27 may further help the inside of the probe and hence the sensor to more contantly reflect the surrounding temperature. Thus, the sensor receives heat transfer from both internal and exernal probe surfaces. This stands in contrast to conventional temperature probe designs, which do not allow internal process heat transfer and have additional internal mass to resist and delay transfer of heat to the temperature sensitive material.

The use of a support casing having an overall lower thermal conductivity further enhances performance of the sensor as well as the overall performance of the temperature probe. The support casing in conjunction with the heat dissipation mechanism such as fins 49, serves to reduce the transfer of heat along the support casing and away from the tip casing. For example, as illustrated with respect to the drawings, the use of cooling fins 49 along with a cylindrical metal casing 22 with a lower thermal conductivity serves to reduce or minimize stem conduction of heat which might degrade the probe seal 50 and insulation around wires or leads 51.

The dimensions of the tip casing and openings such as transverse holes 26 and 27 as well as other portions of a probe, may be varied. The use of the present inventive method is believed to facilitate such variations, particularly with regard to the use of probes having relatively smaller dimensions, since the use of the method facilitates more exact placement of the sensing element and facilitates the proper location of any leads attached to the sensing element. By way of example and as illustrated by the above detailed description, the generally rigid stalk facilitates both insertion of wires into and insulation from the support casing. Further, the notch is located and sized to protect the junction 40 during assembly, while the barrier wall forms part of the notch and facilitates control of the movement and location of the sensing element into and in the bore. As indicated by the above disclosure the guide cavity further aids in controlling movement of the barrier wall portion of the generally rigid stalk and so facilitates accurate location of the junction 40 in relation to the walls of generally cylindrical cavity 29. Thus, depending upon the flexibility and length of wires 35 and the exact location of the notch, contact of the wires 35 with the wall common to cylindrical bore 29 and guide cavity 39 prior to the addition of a refractory cement may be more easily avoided. All of this in turn allows greater accuracy in placement, thus facilitating assembly of probes with smaller dimensions or with improved quality control or both. This is so whether the probe has one or more cylindrical bores with one or more sensing elements, respectively.

A number of variations to the foregoing method are possible. For example, depending upon the flexibility of the junctions 40, lead wires 35 and sensor wires 35A, it may be advantageous to vary the shape of the guide cavity or the barrier wall. For example, the barrier wall may be slightly tapered away from the tip of the generally rigid stalk. Alternately, the guide cavity may fit more closely around the generally rigid stalk. However, the shape and size should preferably be such as to facilitate controlled location of the sensing element while avoiding contact of the wires with the metal portions of the probe.

The rigidity of the stalk may likewise be varied, though it should preferably be sufficiently rigid to prevent contact of the wires with the metal portions of the tip casing and be generally rigid to thereby facilitate placement and location of the sensing element and the wires attached thereto. Similarly, the number of wires and the location of the junction 40 may be varied as can the location and configuration of the notch.

Further modifications and alternative embodiments of this inventive assembly method will be apparent to those skilled in the art having the benefit of this disclosure. Accordingly, this description is to be construed as illustrative only and for the purpose of teaching those skilled in the art the manner of carrying out the invention according to the patent statutes. For example, equivalent materials may be substituted for those specifically illustrated and described herein and certain features of the invention may be utilized independently of the use of other features. All this would be apparent to one skilled in the art after having the benefit of this disclosure and this detailed description of the invention.

What is claimed is:

1. A method for assembling an instrument having at least one receiving cavity to receive an insertion element, the method comprising the steps of:
    (a) providing a guide cavity in the instrument;
    (b) providing a generally rigid stalk having a tip and an extension end and at least one longitudinal bore of sufficient diameter to permit a lead to be threaded therethrough;

(c) forming an opening on the surface of the stalk at a location spaced sufficiently from the tip to form a barrier wall between the opening and the tip, and to a depth sufficient to place the opening in communication with at least one of the longitudinal bores so as to allow passage of lead wires therethrough while leaving a sufficient portion of the stalk to support the barrier wall during assembly and subsequent operation of the instrument;

(d) threading the lead through at least one longitudinal bore in the stock and the opening to expose the terminus of the lead by extending the terminus from the opening;

(e) attaching the terminus of the lead to the insertion element to form a junction between the terminus of the lead and the insertion element;

(f) inserting the insertion element into the receiving cavity by bringing the tip of the stalk into the guide cavity while initially maintaining the position of the insertion element with respect to the stalk; and (g) thereafter securing the insertion element in the receiving cavity.

2. The method of claim 1, further comprising the step of locating a portion of the insertion element at a point behind the tip of the stalk and in a position generally parallel to the stalk, to facilitate alignment of the stalk with the receiving cavity and said step occurring after the step of attaching the terminus of the lead to the insertion element.

3. A method for assembling a resistance thermal detector having at least one receiving cavity in a tip casing to receive a sensing element, the method comprising the steps of:

(a) providing a guide cavity of predetermined length in the tip casing, said guide cavity being located so as to open in the same direction as the receiving cavity;

(b) providing a generally rigid stalk having a tip and an extension end and at least one longitudinal bore of sufficient diameter to permit a lead to be threaded therethrough;

(c) forming an opening on the surface of the stalk at a location spaced sufficiently from the tip such that the distance between the tip of the stalk and the beginning of the opening is at least as long as the length of the guide cavity and thereby forms a barrier wall between the opening and the tip, said opening being to a depth sufficient to place the opening in communication with at least one of the longitudinal bores while leaving a sufficient portion of the stalk to support the barrier wall during assembly and subsequent operation of the resistance thermal detector;

(d) threading a lead through at least one longitudinal bore in the stock and the opening to expose the terminus of the lead by extending the terminus of the lead from the opening;

(e) attaching the terminus of the lead to a sensing element lead attached to the sensing element to form a junction between the terminus of the lead and the sensing element lead, the maximum distance between the surface of the opening and the sensing element being minimized to prevent inadvertent contact with the guide cavity walls;

(f) locating a portion of the sensing element at a point behind the tip of the stalk and in a position generally parallel to the stalk to thereby facilitate insertion of the sensing element into the receiving cavity;

(g) inserting the sensing element into the receiving cavity by bringing the tip of the stalk into the guide cavity while initially maintaining the position of the sensing element with respect to the stalk to thereby protect the junction from stresses caused by flexing of the lead and sensor wires and from inadvertent contact with the guide cavity walls; and (h) thereafter securing the sensing element in the receiving cavity.

4. The method of claim 3, wherein the generally rigid stalk consists of a non-conductive material insulating the lead wires from the support casing.

5. The method of claim 3, wherein the guide cavity has a generally frustoconical inner surface.

6. The method of claim 5, wherein the tip of the stalk is inserted into the guide cavity using the guide cavity's frustoconical inner surface as a guide for centering the stalk in the guide cavity.

7. The method of claim 3, further comprising the step of bringing the junction inside the opening in the stalk after the step of attaching the terminus of the lead to the sensing element lead.

8. The method of claim 3, further comprising the step of filling the receiving cavity with a displaceable support material prior to inserting the sensing element into the receiving cavity.

9. The method of claim 3, further comprising the step of filling the guide cavity with a displaceable support material after inserting the sensing element into the receiving cavity.

10. The method of claim 3, wherein the length of the portion of the sensing element located behind the tip of the stalk is greater than the depth of the receiving cavity.

11. A method for assembling a resistance thermal detector having at least one receiving cavity in a tip casing to receive a sensing element, the method comprising the steps of:

(a) providing a guide cavity in the tip casing, the guide cavity being spaced from the receiving cavity and having a generally frustoconical inner surface;

(b) providing a generally rigid stalk having a tip at least partially matable with said guide cavity, an extension end and at least one longitudinal bore of sufficient diameter to permit a lead to be threaded therethrough;

(c) forming an opening on the surface of the stalk at a location spaced sufficient from the tip to form a barrier wall between the opening and the tip, and to a depth sufficient to place the opening in communication with at least one of the longitudinal bores while leaving a sufficient portion of the stalk to support the barrier wall during assembly and subsequent operation of the resistance thermal detector;

(d) threading a lead through at least one longitudinal bore in the stalk and the opening to expose a terminus of the lead by extending the terminus of the lead from the opening;

(e) attaching the terminus of the lead to a sensing element lead attached to the sensing element to form a junction between the terminus of the lead and the sensing element lead;

(f) bringing the junction inside the opening in the stalk while locating a portion, in length generally greater than or equal to the depth of the guide cavity, of the sensing element at a point behind the tip of the stalk and in a position generally parallel to the stalk;

(g) filling the receiving cavity with a displaceable support material;

(h) inserting the sensing element into the receiving cavity by bringing the tip of the stalk into the guide cavity using the frustoconical inner surface as a guide for centering the stalk in the guide cavity while initially maintaining the position of the sensing element with respect to the stalk to thereby protect the junction from stresses caused by flexing of the lead and sensor wires and from inadvertent contact with the guide cavity walls;

(i) filling the guide cavity with a displaceable support material; and (j) thereafter securing the sensing element in the receiving cavity and the stalk in the guide cavity.

12. The method of claim 11 wherein the steps filling the receiving cavity and the guide cavity each with a displaceable support material comprises the step of filling each with a liquid-like adhesive material.

13. The method of claim 11 wherein the generally rigid stalk is constructed of non-conductive material insulating the lead wires from the support casing.

* * * * *